United States Patent
Kotzsch et al.

[11] 3,912,774
[45] Oct. 14, 1975

[54] ORGANOSILANE ESTERS OF TERTIARY ALCOHOLS

[75] Inventors: Hans Joachim Kotzsch, Rheinfelden; Hans Joachim Vahlensieck, Wehr, both of Germany

[73] Assignee: Dynamit Nobel Aktiengesellschaft, Troisdorf, Germany

[22] Filed: Jan. 25, 1974

[21] Appl. No.: 436,775

[30] Foreign Application Priority Data
Jan. 31, 1973  Germany.............................. 2304554

[52] U.S. Cl. 260/448.8 R; 117/124 F; 117/126 GS; 117/126 GQ
[51] Int. Cl.² ..................... C07F 7/04; C07F 7/18
[58] Field of Search ............................. 260/448.8 R

[56] References Cited
UNITED STATES PATENTS

| | | | |
|---|---|---|---|
| 2,843,615 | 7/1958 | Linville ........................ | 260/448.8 R |
| 2,963,503 | 12/1960 | Marsden ....................... | 260/448.8 R |
| 2,978,471 | 4/1961 | Fekete .......................... | 260/448.8 R |
| 2,995,594 | 8/1961 | Fekete .......................... | 260/448.8 R |
| 2,996,530 | 8/1961 | Fekete .......................... | 260/448.8 R |
| 3,019,248 | 1/1962 | Fekete .......................... | 260/448.8 R |
| 3,067,229 | 12/1962 | Fekete ...................... | 260/448.8 R X |
| 3,122,581 | 2/1964 | Pike .............................. | 260/448.8 R |

*Primary Examiner*—Paul F. Shaver
*Attorney, Agent, or Firm*—Burgess, Dinklage & Sprung

[57] ABSTRACT

A compound of the formula

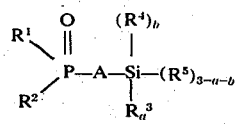

I wherein $R^1$ and $R^2$ are each independently an alkyl radical or phenyl;

$R^3$ and $R^4$ are each independently an aliphatic or cycloaliphatic radical;

$R^5$ = a tertiary alkyl radical;

$a = 0$ or 1;

$b = 0, 1$ or 2;

$a + b$ do not exceed 2; and

A = a bivalent alkenyl radical; a process for preparing such a compound by contacting a dialkyl phosphite of the formula

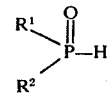

II wherein $R^1$ and $R^2$ have the previously assigned significance with an alkenyl silicon ester of the formula

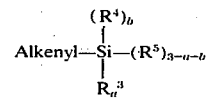

III wherein $a$, $b$, $R^3$, $R^4$ and $R^5$ have the previously assigned significance and alkenyl refers to an alkenyl radical, in the presence of an initiator.

21 Claims, No Drawings

ORGANOSILANE ESTERS OF TERTIARY ALCOHOLS

BACKGROUND OF THE INVENTION

Field of the Invention

This invention is directed to phosphorus organosilane esters of tertiary alcohols of the general formula

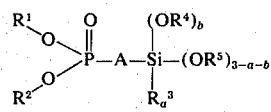
  I wherein $R^1$ and $R^2$ are each independently an alkyl radical or phenyl;

$R^3$ and $R^4$ are each independently an aliphatic or cycloaliphatic radical;

$R^5$ is a tertiary alkyl radical;

$a = 0$ or $1$;

$b = 0, 1$ or $2$;

A + B do not exceed 2; and

A = a bivalent alkenyl radical, by reaction of a dialkyl phosphite with an alkenyl silicon ester. This invention is particularly directed to the preparation of phosphorus organosilane esters of tertiary alcohols which are hydrolysis resistent. This invention is also directed to the preparations of compositions of matter which are relatively pure and contain a high percentage of phosphorus organosilane esters of tertiary alcohols.

It has been known to prepare 2-triethoxysilane-ethane phosphonic acid dimethyl ester and 2-tri-n-butoxysilane-ethanephosphonic acid diethyl ester and the disclosure of the preparation of the same is found in German Federal Pat. 1,090,210. Similar compounds and a method of preparing these compounds are also described in U.S. Pat. No. 3,122,581.

One particular feature characterizes these compounds and the method for that preparation. In all of the known processes for the preparation of these organosilane esters there is employed as a reactant a silicon ester which is one derived from a primary alcohol. The molecular arrangement of the resultant phosphorous organosilane ester is one in which the phosphite end of the molecule is relatively bulky compared to the silane portion of the molecule. This is owing to the fact in particular that the alcohol from which the silane reactant is derived is a primary alcohol. It has become desirable to provide a molecule which is balanced in respect of the substituents bonded to the centrally positioned alkenyl group. In particular it has become desirable to provide a phosphorous organosilane ester having branched alkyl groups on the silicon portion of the molecule. Moreover, it has become desirable to provide a hydrolysis resistant phosphorous organosilane ester. It is known that organosilane esters and phosphorous organosilane esters of primary alcohols readily hydrolyze in the presence of very minor amounts of water to yield condensation products. In many instances, particularly in the plastics industry, it is desirable to have an organosilane ester which does not readily hydrolyze.

Attempts have been made to prepare phosphorus organosilanes of tertiary alcohols by reacting known alkoxysilaneethanephosphonic acid esters with tertiary alkyl peroxides at elevated temperatures. The procedure has been found to be risky on account of the large amount of peroxide required in the reaction. Moreover, the products which have been obtained are extremely impure and it is rather difficult to separate the resulting mixtures of the starting silane and the corresponding monotertiary alkoxy-d-n-alkoxysilane compound. Thus, it has become particularly desirable to provide a tertiary alkoxy organosilane ester of a phosphorous compound. Moreover, it has become desirable to provide a process for the synthesis of relatively poor phosphorus organosilane esters of tertiary alcohols.

SUMMARY OF THE INVENTION

The long felt desideratum in the art has been answered by a process for the preparation of a phosphorus organosilane ester of a tertiary alcohol of the formula:

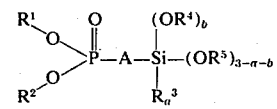
  I wherein $R^1$ and $R^2$ are each independently an alkyl radical or phenyl;

$R^3$ and $R^4$ are each independently an aliphatic or cycloaliphatic radical;

$R^5$ is a tertiary alkyl radical;

$a = 0$ or $1$;

$b = 0, 1$ or $2$;

$a + b$ do not exceed 2;

and

A = a bivalent alkenyl radical; which comprises contacting a dialkyl phosphite of the formula

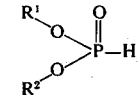
  II wherein X, $R^1$ and $R^2$ have the above assigned significance with an alkenyl silicon ester of the formula

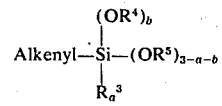
  III wherein $a$, $b$ $R^3$, $R^4$ and $R^5$ have the previously assigned significance and alkenyl refers to an alkenyl radical in the presence of an initiator.

It has been found that by the described process high yields of phosphorus organosilane esters of a tertiary alchohol are provided. Moreover, the desired phosphorus organosilane ester is easily to separate from the reaction mixture.

These phosphorus organosilane esters of tertiary alcohols have strikingly different properties when compared with esters of primary alconols. Whereas the same compound derived from a primary alcohol is very susceptible to hydrolysis in the presence of only minor amounts of water at room temperature, the phosphorus organosilanes of the present invention are very stable against hydrolysis. This makes these compositions particularly useful in the plastics industry. For instance, the hydrolysis resistance can be so great that no hydrolysis will occur even when the composition is placed in boiling water. This occurs when the three alkoxy groups attached to the silicon atom are tertiary alkoxy groups. The new products therefore are employed in aqueous solutions for filing of glass-fibers.

The new compounds behave differently from the known phosphorus organosilane esters under conditions of thermal stress. For instance, when they are heated to a temperature above about 150°C., isoalkylenes split off with cross-linking. This reaction is important in hydrophobic systems such as those encountered in the case of many plastics. The new products are therefor employed as crosslinking agents in copolymer manufactured from ethylenically unsaturated momomers. They are useful as softeners, too. The method by which the compounds are prepared involves contacting an alkenyl silicon ester of the above formula III with a dialkyl phosphite of the above formula II wherein $R^1$ and $R^2$ represent identical or different alkyl radicals, especially alkyl radicals having from 1 to 8 carbon atoms. The reaction is effected at elevated temperatures in the presence of an initiator.

DESCRIPTION OF PREFERRED EMBODIMENTS

In the preparation of the new compounds it is preferred that the alkenyl silicon ester reactant be one in which the alkenyl group has between 1 and 10 carbon atoms. More especially, the alkenyl group can have between 2 and 4 carbon atoms and is preferably vinyl or propenyl. Similarly. the $R^3$ and $R^4$ groups are each independently an aliphatic or cycloaliphatic radical. More especially, $R^3$ and $R^4$ are alkyl radicals of 1 to 8 carbon atoms, preferably 1 to 4 carbon atoms. From the generic formula of the alkenyl silicon esters it is to be realized that the number of tertiary alkoxy groups can vary provided that to the silicon atom there is bonded at least one tertiary alkoxy group. Referring to the formula, $R^5$ is a tertiary alkyl group and as depicted in the formula there is always at least one $OR^5$ group. The values a and b are as reported above. The reaction proceeds with equal facility whether $a$ is 0 or 1 or $b$ is 0 or 2.

The preparation of the alkenyl silane esters of tertiary alcohols can be carried out in accordance with the method disclosed in copending application Ser. No., 436,759 filed concurrently herewith of Hans Joachim Kotzsh, HansJoachim Vahlensieck and Claus-Dieter Seiler. According to the method therein disclosed, alkenyl silane esters of tertiary alcohols are prepared in a two-stage process wherein in a first stage a partial akenylsilicon ester of a primary or secondary alcohol is prepared. This is done contacting in the liquid phase an alkenyl halogen silane such as vinyltrichlorosilane with a primary or secondary alcohol, contacting being done in the liquid phase without any contact occurring in the gas phase. The stoichiometric amount of the primary or secondary alcohol is employed bearing in mind that at least one halogen group is to remain available for subsequent reaction with a tertiary alcohol. There is obtained a halogen alkoxy silane with is, thereafter, contacted with a tertiary alcohol such as tertiary butanol in the presence of an acid-binding agent. The claimed ester so prepared is recovered in good yields and in a high purity.

The reaction is normally carried out by contacting the alkenylsilicon ester with a dialkylphosphite. The dialkylphosphite is one in which the alkyl groups are each independently C1–C8 alkyl groups, preferably C1–C4 alkyl groups.

The reaction is conducted at an elevated temperature preferably between 120°and 170°C. The use of initiators, which do not initiate the reaction until the temperatures are above 150°C are to be avoided insofar as possible, since a reaction which begins at this temperature is usually accompanied by a decomposition reaction owing to the high temperatures involved which decomposition reaction increase as the temperature increases. Temperatures below 120°C, as for example 100°C, also be used, however, in the preparation of the new compounds provided that the initiator used can initiate a reaction at such lower temperature. Such is the case with the tertiarybutylper-2-ethylhexoate initiator employed in Example 4 below.

The reaction involved in the preparation of the novel phosphorus organosilane esters is one which is accompanied by heat and is considered to be temperature sensitive. The addition reaction of dialkylphosphites on to tertiary alkylsilane esters in the presence of an initiator such as a peroxide is preferably carried out by placing a portion of the dialkylphosphite reactant in a reaction vessel in a quantity amounting to between 10 and 200% of the amount to be reacted. The composition is heated up to the onset temperature of the reaction which depends mainly on the activity of the compound to be used as the initiator. Thereafter a mixture comprising the balance of the dialkylphosphite reactant, the alkenylsilicon ester and the initiator is stirred into the preheated dialkylphophite, whereupon self-heating takes place. At this stage, the external heat source used to heat up the first dialkylphosphite portion can be removed. The reaction proceeds through the use of heat developed during the addition reaction.

The reaction can also be performed continuously, if stoichiometric mixtures of dialkylphosphite and the corresponding alkenyl tertiary alkoxysilane, containing the initiator in solution, are charged in the liquid phase through a pass-through heater by means of which the reaction temperature is controlled. The detention times amount to from 20 seconds to about 180 minutes. It is preferred that the detention times be between 110 seconds and 12 minutes.

The yields obtained by the process of the present invention generally vary between 78 and 93%, depending upon the initiator employed.

After the reaction is complete, the desired products can be recovered by conventional means as by employing a vacuum distillation technique utilizing a 4-tray column. This is particularly suitable where especially pure products are desired. For most applications, however, the purity of the crude products itself will suffice.

The silanes which may be used as starting products include both silance esters of tertiary alcohols with alkoxy groups originating from tertiary and primary alcohols, and those in which the alkoxy group originates from tertiary alcohols only. The alkyl radical of the alkoxy group can be interrupted even in the primary alkoxy radical by a hetero atom such as —O— or —S—.

The alkenyl radical of the silane esters is preferably a $C_2$ or $C_3$ radical; however, it may also be any other ethylenically unsaturated aliphatic or cycloaliphatic radical, especially ethylenically unsaturated alkyl or cycloalkyl groups of 2 to 8 carbon atoms, such as the octadecene radical and cyclohexene radical.

Examples of such usable silane esters are the following compounds:

Vinyltritertiarybutoxysilane
Allyltritertiarybutoxysilane
Vinylditertiarybutoxyethoxysilane
Vinyltertiarybutoxydiethoxysilane
Allyltertiarybutoxydimethoxysilane
Propenyltritertiarybutoxysilane
Vinyltertiarybutoxydi-(methoxyethoxy)-silane and the alkenyltertiarypentoxysilane esters corresponding thereto.

Diethylphosphite and dimethylphosphite are suitable as preferred compounds of the dialkylphosphites which may be used as additional starting components; the radical R' in the formula given above for the useable phosphites may, however, also be a higher alkyl radical having up to 8 carbon atoms. One can also use diphenylphosphite as a second starting compound.

Suitable initiators are peroxides or aliphatic diazo compounds as specified in German Federal Pat. 1,090,210 or U.S. Pat. No. 3,122,581. Preferred are azodiisobutyronitrile, ditertiarybutylperoxide, 1,1-ditertiarybutylperoxy-3,3,5-trimethylcyclohexane, tertiarybutylper-2-ethylhexoate and dibutylphthalate.

In order to more fully illustrate the nature of the invention and the manner of practicing the same, the following non-limiting examples are presented.

Example 1

Preparation of 2-tertiarybutoxydiethoxysilaneethanephosphonic acid diethyl ester.

In a 2-liter multiple-neck flask equipped with an internal termometer, a nitrogen-flooded reflux condenser, stirrer and dropping funnel, 276 g of diethylphosphite was heated to 150°C. Then the heater was removed and a mixture, consisting of 276 g of diethylphosphite, 872 g of vinyltertiarybutoxydiethoxysilane and 11.7 g of ditertiarybutylperoxide was added drop by drop, with stirring, over a period of 80 minutes. The drip rate was selected in such a manner that an internal temperature between 152°and 156°C was established. After the addition of this mixture had been completed, the mixture was stirred for 40 minutes at 150°C and then the reaction mixture was processed by vacuum distillation. The yield of 2-tertiarybutoxydiethoxysilaneethaneophosphonic acid diethyl ester amounted to 1155 g (81%). The purity of the product was about 97–100%.

Boiling point: 127 to 132°C (2 Torr)
$D_4^{20}$: 1.016
$n_D^{20}$: 1.4250

Elemental analysis
($C_{14}H_{33}O_6PSi$, molecular weight 356)

|  | C | H | P | Si |
|---|---|---|---|---|
| Calculated | 47.2% | 9.3% | 8.7% | 7.9% |
| Found | 47.2 | 9.6% | 8.8% | 7.8% |

Example 2

Preparation of 2-ditertiarybutoxyethoxysilaneethanephosphonic acid diethyl ester.

Analogously to Example 1, 276 g of diethylphosphite was heated to 123°C. Then the heat source was removed and a mixture consisting of 276 g of diethylphosphite, 985 g of vinylditertiarybutoxyethoxysilane and a solution of 12 g of 1,1-ditertiarybutylperoxy-3,3,5-trimethylcyclohexane in 12 g of dibutylphthalate was added drop by drop, with stirring. The drip rate was adjusted so that an internal temperature between 123°and 128°C was established. After the addition of this mixture was completed, stirring was continued for 40 minutes at 130°C, and then the reaction mixture was processed by vacuum distillation. The yield of 2-ditertiarybutoxyethoxysilaneethanephosphonic acid with diethyl ester amounted to 1220 g (79.5%). The composition contained the desired phosphonic acid diethyl ester in a purity of about 97–100%.

Boiling point: 128 to 132°C (1 Torr)
$D_4^{20}$: 1.004
$n_D^{20}$: 1.4252

Elemental analysis
($C_{16}H_{37}O_6PSi$, molecular weight 384)

|  | C | H | P | Si |
|---|---|---|---|---|
| Calculated | 50.1% | 8.67% | 8.08% | 7.29% |
| Found | 50.2% | 8.8% | 8.1% | 7.1% |

EXAMPLE 3

Preparation of 2-tritertiarybutoxysilaneethanephosphonicaciddiethylester.

Analogously to Example 1, 207 g of diethylphosphite was heated to 120°C. Then the heat source was removed and a mixture consisting of 207 g diethylphosphite, 822 g vinyltritertiarybutoxysilane and 13 g tertiarybutylper-2-ethylhexoate was added drop by drop, with stirring, over a period of 105 minutes. Meantime, the internal temperature was maintained by periodical heating between 122°and 129°C. After the addition of the mixture was completed the reaction mixture was stirred at 130°for 2 hours and then processed by vacuum distillation. The yield of 2-tritertiarybutoxysilaneethanephosphoic acid diethyl ester was 1234 g (89%). The purity of the product was about 97–100%.

Boiling point: 141 to 144°C (1 Torr)
$D_4^{20}$: 0.984
$n_D^{20}$: 1.4257

Elemental analysis
($C_{18}H_{41}O_6PSi$, molecular weight 412)

|  | C | H | P | Si |
|---|---|---|---|---|
| Calculated | 52.4% | 9.95% | 7.5% | 6.8% |
| Found | 52.2% | 10.1% | 7.4% | 6.6% |

EXAMPLE 4

Preparation of 3-tritertiarybutoxysilanepropanephosphonic acid dimethyl ester.

Analogously to Example 1, 220 g of dimethylphosphite was heated to 120°C. Then the heat source was removed and a mixture consisting of 220 g dimethylphosphite, 1152 g allyltritertiarybutoxysilane and 17 g tertiarybutylper-2-ethylhexoate was added drop by drop, with stirring, over a period of 105 minutes. Meantime the internal temperature was maintained by periodical heating between 122° and 129°C. After the adding of the mixture was completed, the mixture continued to be stirred at 130°C for 2 hours and then it was processed by vacuum distillation. The yield of 3-tritertiarybutoxysilanepropanephosphonic acid dimethyl ester amounted to 1354 g (85%). The purity of the product was about 97–100%.

Boiling point: 139 to 142°C (1 Torr)
$D_4^{20}$: 0.982
$n_D^{20}$: 1.4236

Elemental analysis
($C_{17}H_{39}O_6PSi$, molecular weight 398)

|  | C | H | P | Si |
|---|---|---|---|---|
| Calculated | 51.2% | 9.8% | 7.8% | 7.0% |
| Found | 51.4% | 9.6% | 7.9% | 7.2% |

EXAMPLE 5

Preparation of 2-tertiarybutoxy-di-(2'-methoxyethoxy)-silaneethanephosphonic acid diethyl ester.

In a 4-liter multiple-neck flash equipped with internal thermometer, nitrogen-flooded reflux condenser, stirrer and dropping funnel 552 g of diethylphosphite was heated to 150°C. Then the heat source was removed and a mixture consisting of 552 g diethylphosphite, 2224 g vinyltertiarybutoxydi-(2-methoxyethoxy)-silane and 23.4 g of ditertiarybutylperoxide was added drop by drop, with stirring, over a period of 80 minutes. The drip rate was selected so that an internal temperature between 152° and 156°C established itself. After addition of this mixture was completed, stirring continued for 40 minutes at 150°C, and then the reaction mixture was processed by vacuum distillation. The yield of 2-tertiarybutoxy-di-(2'-methoxyethoxy)-silaneethanephosphonic acid diethyl ester amounted to 2729 g (82%). The purity of the product was about 96–100%.

Boiling point: 148 to 151°C (0.2 Torr)
$D_4^{20}$: 1.116
$n_d^{20}$: 1.4408

Elemental analysis
($C_{16}H_{37}O_8PSi$, molecular weight 416.5)

|  | C | H | P | Si |
|---|---|---|---|---|
| Calculated | 46.18% | 8.96% | 7.45% | 6.72% |
| Found | 46.3% | 9.0% | 7.3% | 6.5% |

EXAMPLE 6

Preparation of 2-tertiarybutoxydiethoxysilaneethanephosphonic acid diphenyl ester.

In a 2-liter multiple neck flask equipped with an internal thermometer, a nitrogen-flooded reflux condenser, stirrer and dropping funnel is introduced 1 mol of diphenylphosphite which is heated to 150°C. The heater is removed and there is introduced therein a mixture consisting of 1 mol of diphenylphosphite and 2 mols of vinyltertiarybutoxydiethoxysilane and 20 g of azodiisobutyronitrile. This mixture is added drop by drop to the diphenylphosphite in the reactor and the drip rate is selected in such a manner that an internal temperature between about 150° and 165°C is established. After the addition of this mixture is complete the mixture is stirred for 1 hour at 155°C and the reaction mixture is processed by vacuum distillation. The reaction mixture is not subjected to external heat once the dropwise addition of the mixture of diphenylphosphite, vinyltertiarybutoxydiethoxysilane and azodiisobutyronitrile had begun. Excellent yields are obtained in good purity.

EXAMPLE 7

Preparation of 2-tritertiarybutoxysilanebutanephosphonic acid diethyl ester.

Analogously to Example 1, ½ mol of diethylphosphite is introduced into a reaction vessel and is heated to 120°C. The heat source is removed and a mixture consisting of ½ mol of diethylphosphite, a mol of butene tritertiarybutoxysilane and 18 g of 1,1-ditertiarybutyl-peroxy-3,3,5-trimethylcyclohexane is added drop by drop, with stirring, over a period of 120 minutes. Meantime, the internal temperature is maintained by periodic gentle heating so that a temperature between 130° and 140°C is maintained. After the addition is completed, the reaction mixture is stirred for an additional 2 ½ hours at 145°C and the reaction mixture is processed by vacuum distillation. The desired product is recovered.

EXAMPLE 8

Preparation of 2-tritertiarypentoxysilaneethanephosphonic acid diethyl ester.

Analogously to Example 3, 1 mol of diethylphosphite is heated to 120°C. Then the heat is removed and a mixture consisting of 1 mol of diethylphosphite, 2 mols of vinyltritertiarypentoxysilane and 13 g of tertiarybutylper-2-ethylhexylate is added drop by drop, with stirring, over a period of 105 minutes. Meantime, the initial temperature is maintained by periodic heating between 135° and 138°C. After the addition of the mixture is completed, the reaction mixture is stirred at 135°C for 2 hours and then is processed by vacuum distillation. Yields of the desired product are obtained.

It will be understood that the above process is conducted by reacting stoichiometric or superstoichiometric amounts of the dialkylphosphite with alkenylsilicon ester. Preferably, there are between 1 and 2 mols of dialkylphosphite per mol of alkenyl silicon ester reactant.

The amount of catalyst to be employed is generally dependent upon the activity of the initiator and the temperature at which the process is to be conducted. Generally speaking, the amount of catalyst is between 0.01 and 20 % preferably between 0.05 and 10 % based upon the combined weight of the dialkylphosphite and alkenylsilicon ester reactants.

The present invention is generally carried out at atmospheric pressure.

What is claimed is:

1. A compound of the formula $$\underset{R^2\diagdown O}{\overset{R^1\diagdown O}{>}}\underset{O}{\overset{\parallel}{P}}-A-\underset{R_a^3}{\overset{(OR^4)_b}{Si}}-(OR^5)_{3-a-b} \qquad I$$

wherein $R^1$ and $R^2$ are each independently an alkyl radical or phenyl;

$R^3$ and $R^4$ are each independently an alkyl radical having 1 to 8 carbon atoms;

$R^5$ is a tertiary alkyl radical;

A is a bivalent alkenyl radical;

$a = 0$ or 1;

$b = 0$, 1 or 2;

$a + b$ does not exceed 2.

2. A compound of claim 1 which is present in a purity of 96% by weight.

3. A compound according to claim 1 which is present in a purity of at least 100% by weight.

4. A compound according to claim 1 wherein $R^5$ is tertiary butyl or tertiary pentyl.

5. A compound according to claim 1 wherein $R^5$ is tertiary butyl or tertiary pentyl.

6. A compound according to claim 5 wherein $R^1$ and $R^2$ are each independently alkyl of $C_1$–$C_8$.

7. A compound according to claim 5 wherein $R^1$ and $R^2$ are $C_1$–$C_4$ alkyl groups.

8. A compound according to claim 5 wherein A is a $C_2$–$C_{10}$ alkenyl group.

9. Ditertiarybutoxyalkoxysilanephosphonic acid dialkyl esters of the general formula $$\underset{R^2O\diagup}{\overset{R^1O\diagdown}{>}}\underset{\overset{\parallel}{O}}{P}-A-\underset{OR^4}{\overset{}{Si}}-[OC(CH_3)_3]_2$$

in which $R^1$ and $R^2$ each independently represent an alkyl radical of C1 to C8 carbon atoms, $R^4$ is an alkyl radical of 1 to 8 carbon atoms and A is a bivalent alkylene radical of 2-10 carbon atoms.

10. A tertiarybutoxysilanealkanephosphonic acid dialkyl ester of the formula $$\underset{R^2O\diagup}{\overset{R^1O\diagdown}{>}}\overset{\overset{O}{\parallel}}{P}-A-Si[OC(CH_3)_3]_3$$

wherein $R^1$ and $r^2$ each represent a $C_1$ to $C_8$ alkyl radical and A represents a bivalent alkylene radical of 2 to 10 carbon atoms.

11. Tertiaryalkoxysilanepropanephosphonic acid dialkyl esters of the general formula $$\underset{R^2O\diagup}{\overset{R^1O\diagdown}{>}}\overset{\overset{O}{\parallel}}{P}-CH_2-CH_2-CH_2-\underset{R_a^3}{\overset{}{Si}}(OR^4)_b(OR^5)_{3-a-b}$$

in which $R^5$ is a tertiary pentyl or butyl group, $R^1$ and $R^2$ are each independently a $C_1$ to $C_8$ alkyl radical, $R^3$ and $R^4$ are each independently an alkyl radical of C1–C8 carbon atoms, and $a$ and $b$ represent either 1 or 2 independently of one another.

12. 2-Tritertiarybutoxysilaneethanephosphonic acid diethyl esters of the formula $$\underset{OC_2H_5}{\overset{OC_2H_5}{\mid}}\overset{\overset{}{O=P}}{}-CH_2-CH_2-Si-[OC(CH_3)_3]_3$$

13. 3-Tritertiarybutoxysilanepropanephosphonic acid diethyl esters of the formula $$\underset{OC_2H_5}{\overset{OC_2H_5}{\mid}}O=P-CH_2-CH_2-CH_2-Si-[OC(CH_3)_3]_2$$

14. 2-Ditertiarybutoxyethoxysilaneethanephosphonic acid diethylester of the formula $$\underset{OC_2H_5}{\overset{OC_2H_5}{\mid}}O=P-CH_2-CH_2-\underset{OC_2H_5}{\overset{}{Si}}-[OC(CH_3)_3]_2$$

15. 2-Tertiarybutoxydi-(2'-methoxyethoxy)-silaneethane-phosphonic acid diethyl esters of the formula $$\underset{OC_2H_5}{\overset{OC_2H_5}{\mid}}O=P-CH_2-CH_2-\underset{OC(CH_3)_3}{\overset{}{Si}}(OCH_2-CH_2-O-CH_3)_2$$

16. A process for preparing a phosphorus organosilane ester of a tertiary alcohol of the formula $$\underset{R^2\diagdown O}{\overset{R^1\diagdown O}{>}}\underset{O}{\overset{\parallel}{P}}-A-\underset{R_a^3}{\overset{(OR^4)_b}{Si}}-(OR^5)_{3-a-b} \qquad I$$

wherein $R^1$ and $R^2$ are each independently an alkyl radical or phenyl;

$R^3$ and $R^4$ are each independently an alkyl radical having 1 to 8 carbon atoms;

$R^5$ is a tertiary alkyl radical;

A is a bivalent alkenyl radical;

$a = 0$ or 1;

$b = 0$, 1 or 2;

$a + b$ does not exceed 2, which comprises contacting a dialkylphosphite of the formula

$$\underset{R^2\diagdown O}{\overset{R^1\diagdown O}{>}}\overset{\overset{O}{\parallel}}{P}-H \qquad II$$

wherein X, $R^1$ and $R^2$ have the previously assigned significance with an alkenylsilicon ester of the formula $$\text{Alkenyl}-\underset{R_a^3}{\overset{(OR^4)_b}{Si}}-(OR^5)_{3-a-b} \qquad III$$

wherein $a$, $b$, $R^3$, $R^4$ and $R^5$ have the previously assigned significance and alkenyl refers to an alkenyl radical, in the presence of an initiator selected from the group of organic peroxides and aliphalic diazo compounds.

17. A process according to claim 16 wherein the initiator is one which is effected at a temperature not in excess of 150°C.

18. A process according to claim 17 wherein the initiator is selected from the group consisting of azodiisobutyronitrile, ditertiarybutylperoxide, dibutylphthalate, 1,1-ditertiarybutylperoxy-3,3,5-trimethylcyclohexance and tertiarybutylper-2-ethylhexylate.

19. A process according to claim 16 wherein the reaction is conducted by initially introducing between 10 and 200% of the dialkylphosphite reacted into a reaction vessel and to said vessel containing said phosphite adding the remaining phosphite together with said alkenylsilicon ester and said initiator.

20. A process according to claim 16 wherein the process is carried out at a temperature of between 120° and 170°C.

21. A process according to claim 19 wherein after said remaining phosphite silicon ester and initiator are added, no additional heat is applied to reactants in the reaction vessel.

* * * * *

UNITED STATES PATENT OFFICE
CERTIFICATE OF CORRECTION

PATENT NO. : 3,912,774
DATED : October 14, 1975
INVENTOR(S) : Hans Joachim Kotzsch and Hans Joachim Vahlensieck It is certified that error appears in the above-identified patent and that said Letters Patent are hereby corrected as shown below:

In the Abstract, page 1

Formula I

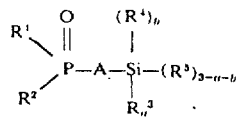   should be   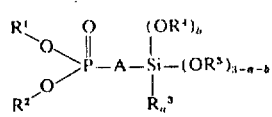

Formula II

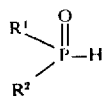   should be   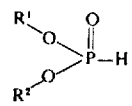

Formula III

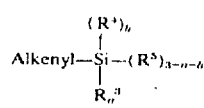   should be   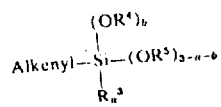

Column 4, line 56

"silance" should be "silane"

Column 5, line 6

"Allylditertiarybutoxymethoxysilane" should be inserted.

Column 11, line 12, "trimethylcyclohexance" should read -- trimethylcyclohexane --.

Signed and Sealed this

Fifteenth Day of February 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,912,774
DATED : October 14, 1975
INVENTOR(S) : Hans Joachim Kotzsch et al It is certified that error appears in the above-identified patent and that said Letters Patent are hereby corrected as shown below:

Claim 4 and claim 5 are duplicates. Therefore, cancel claim 4 and renumber the claims as follows:

Change claim "5" to claim --4--.

Change claim "6" to claim --5--.

Change claim "7" to claim --6--.

Change claim "8" to claim --7--.

Insert the following omitted claim as claim 8:

8. A compound according to claim 7 wherein A is a $C_2$ or $C_3$ alkenyl group.

Signed and Sealed this

Seventeenth Day of May 1977

[SEAL]

Attest:

RUTH C. MASON
*Attesting Officer*

C. MARSHALL DANN
*Commissioner of Patents and Trademarks*